UNITED STATES PATENT OFFICE.

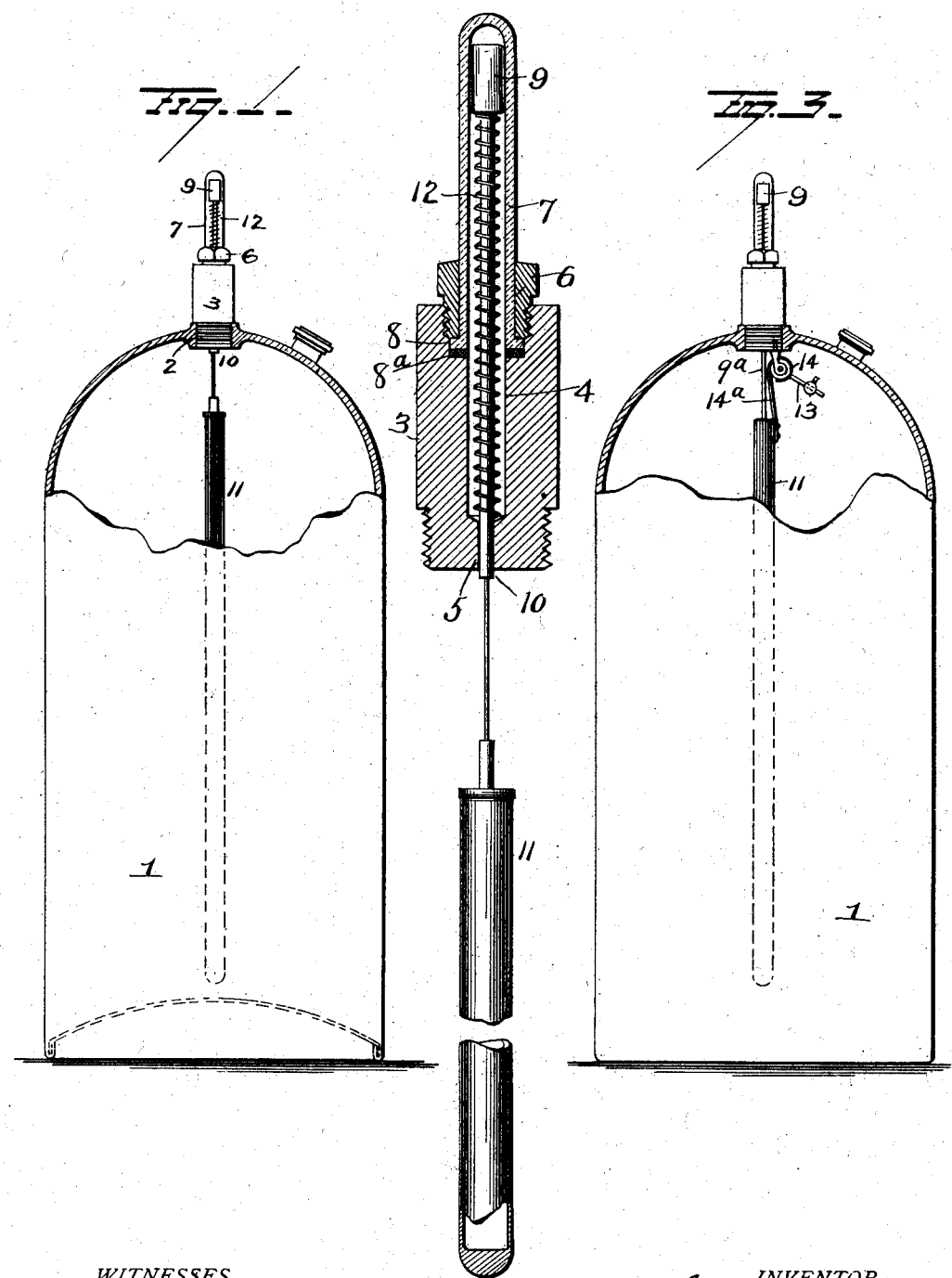

GEORGE WASHINGTON, OF NEW BRIGHTON, NEW YORK.

GAGE.

SPECIFICATION forming part of Letters Patent No. 706,505, dated August 5, 1902.

Application filed July 30, 1901. Serial No. 70,294. (No model.)

*To all whom it may concern:*

Be it known that I, GEORGE WASHINGTON, of New Brighton, in the county of Richmond and State of New York, have invented certain new and useful Improvements in Gages; and I do hereby declare the following to be a full, clear, and exact description of the invention, such as will enable others skilled in the art to which it appertains to make and use the same.

My invention relates to an improvement in gages, and more particularly to gages for indicating the quantity of liquid in a tank or receptacle, the object of the invention being to provide a gage which will accurately indicate the height of liquid in a receptacle with a comparatively slight movement of the parts of the gage.

A further object is to avoid the use of the glass water-gage commonly employed with boilers, tanks, &c., and which for some purposes would have to be very long and very liable to become broken.

A further object is to avoid the use of floats with gages of the class to which my invention relates.

A further object is to produce a gage for indicating the quantity of liquid in a receptacle which shall be simple in construction, compact, and effectual in all respects in the performance of its functions.

With these objects in view the invention consists in certain novel features of construction and combinations and arrangements of parts, as hereinafter set forth, and pointed out in the claims.

In the accompanying drawings, Figure 1 is a view illustrating an application of my invention. Fig. 2 is an enlarged detail view. Fig. 3 is a view of a slight modification.

1 represents a tank for containing hydrocarbon oil or other liquid and is provided at its top with hole 2, having a threaded wall for the reception of the threaded lower end of a block 3. The block 3 is made with vertical chamber 4, restricted at its lower end to form a passage 5, communicating with the tank. The upper end of the chamber 4 is enlarged to form a socket having a threaded wall for the reception of a nipple 6, which serves to retain in place a transparent tube 7, of celluloid or other suitable material, said tube projecting above the nipple and having a flange 8 at its lower end disposed between the lower end of said nipple and the bottom of the socket in which the nipple is located, and a washer $8^a$ may be located under the flange 8. The tube 7 is closed at its upper end and communicates at its lower end with the chamber 4, so as to form a continuation of the latter. A plunger 9 is located within the tube 7 and may register with graduations thereon to indicate the quantity of liquid in the tank, said plunger being actuated and controlled by means of devices and in a manner which will now be explained. A rod, wire, or other suitable device 10 is attached to the plunger 9 and extends freely through the passage 5 to form a convenient means of connecting said plunger with an elongated weight 11, which depends into the tank to a point in proximity to its bottom and serves to displace the liquid therein. A coiled spring 12 is located within the chamber 4 and encircles the rod or connection 10, bearing at its upper end against the plunger 9 and at its lower end against the bottom of the chamber 7. The strength of the spring 12 is so adjusted or regulated with respect to the weight 11 as to accurately counterbalance the latter when the tank contains no liquid, at which time the top of the plunger 9 will be disposed in the lower portion of the tube 7 in line with the top of the nipple 6, and thus indicate zero or that the tank contains no liquid. On filling the tank with oil or other liquid the weight will become immerged as the level of the liquid ascends, and the effective pull of the weight on the spring will gradually diminish, owing to the buoyancy of the liquid, and consequently the spring 12 will expand (being thus relieved to a greater or less extent of the force exerted by the weight) and permit the plunger 9 to rise in the tube 7, and thus denote the height of liquid in the tank until the latter becomes filled, when the top of the plunger will have risen to the top of the tube. As the oil or other liquid is withdrawn from the tank the action will be exactly the reverse to that above described, the effective pull of the weight on the spring gradually increasing, and thus permitting the weight to descend against the resistance of the spring 12 until the liquid leaves the lower end of the weight and the latter is counterbalanced by the spring 12, when the plunger 9 will have reached the lower end of the tube 7 and indicates that the tank is empty.

Instead of the spring 12 a weighted arm 13, Fig. 3, may be secured to a drum 14, mounted in suitable lugs or brackets depending from the block 3, and a flexible device 14ª, such as a cord, attached at one end to the drum and wound partially around the same and attached at the other end to the weight 11, the latter being connected with the plunger 9 by means of a rod 9ª. The weighted arm 13 will be adjusted to counterbalance the weight 11 when the tank is empty and will operate in the same manner as the spring 12.

Various slight changes might be made in the details of construction of my invention without departing from the spirit of my invention or limiting its scope. Hence I do not wish to limit myself to the precise details herein set forth.

Having fully described my invention, what I claim as new, and desire to secure by Letters Patent, is—

1. In a gage for indicating the quantity of liquid in a tank or receptacle, the combination with a closed receptacle, a block secured thereto and a transparent tube supported on said block, of a plunger movable in said tube, a rod depending from said plunger and passing freely through the block, a weight within said closed receptacle and suspended from the lower end of said rod, and means for normally counterbalancing said weight.

2. In a gage, the combination with a closed tank or receptacle, a block secured therein and provided with a chamber, a rod passing through said block and the chamber therein, an enlargement on said rod, a spring on the rod, bearing at one end against said enlargement and at the other end in the bottom of the chamber in the block, and a weight within said closed receptacle and suspended from said rod and counterbalanced by said spring.

3. In a gage for indicating the quantity of liquid in a tank or receptacle, the combination with a block having a chamber therein, a weight to be immersed in the liquid in the tank or receptacle and a transparent tube communicating with said chamber, of a plunger in the tube, a connection between the plunger and weight, and a spring within said chamber, said spring bearing against the plunger and the bottom of said chamber, and acting to counterbalance said weight.

4. In a gage for indicating the quantity of liquid in a tank or receptacle, the combination with a closed receptacle or tank a weight to be immersed in the liquid in the tank or receptacle and a transparent tube carried by said tank or receptacle, of a movable plunger in the tube, a connection between the plunger and said weight and means for counterbalancing said weight.

In testimony whereof I have signed this specification in the presence of two subscribing witnesses.

GEORGE WASHINGTON.

Witnesses:
R. S. FERGUSON,
S. G. NOTTINGHAM.